United States Patent
Tsukada et al.

(10) Patent No.: US 7,985,348 B2
(45) Date of Patent: Jul. 26, 2011

(54) PIEZOELECTRIC CERAMIC COMPOSITION

(75) Inventors: Takeo Tsukada, Tokyo (JP); Masahito Furukawa, Tokyo (JP)

(73) Assignee: TDK Corporation, Tokyo (JP)

( * ) Notice: Subject to any disclaimer, the term of this patent is extended or adjusted under 35 U.S.C. 154(b) by 705 days.

(21) Appl. No.: 12/076,694

(22) Filed: Mar. 21, 2008

(65) Prior Publication Data

US 2008/0237531 A1    Oct. 2, 2008

(30) Foreign Application Priority Data

Mar. 27, 2007 (JP) .................. 2007-080721

(51) Int. Cl.
*H01L 41/187* (2006.01)
(52) U.S. Cl. ............ 252/62.9 R; 252/62.9 PZ; 501/134
(58) Field of Classification Search ............ 252/62.9 R, 252/62.9 PZ; 501/134
See application file for complete search history.

(56) References Cited

U.S. PATENT DOCUMENTS 3,533,951 A * 10/1970 Akashi et al. .......... 252/62.9 PZ

FOREIGN PATENT DOCUMENTS

| DE | 19605050 | * | 4/1997 |
|----|----------|---|--------|
| JP | H04-60073 | | 9/1992 |
| JP | H11-171643 | | 6/1999 |
| JP | H11-180769 | | 7/1999 |
| JP | H16-035350 | | 2/2004 |
| JP | 2005-47745 | | 2/2005 |
| JP | 2005-47746 | | 2/2005 |
| JP | 2005-47747 | | 2/2005 |
| JP | 2005-47748 | | 2/2005 |

* cited by examiner

*Primary Examiner* — C. Melissa Koslow
(74) *Attorney, Agent, or Firm* — Manabu Kanesaka

(57) ABSTRACT

A piezoelectric ceramic composition having a large piezoelectric constant (d) and as well having a large Qm value is to be provided. The piezoelectric ceramic composition aimed at has a composition corresponding to a solid solution containing a first compound possessing a rhombohedral crystal-based perovskite structure, a second compound possessing a tetragonal crystal-based perovskite structure, and a third compound. The third compound is a compound oxide containing Bi as a first component element, Mn as a second component element, and a tetravalent metallic element or a pentavalent metallic element as a third component element. The tetravalent metallic element is at least one member selected from the group consisting of Ti, Zr, Hf, and Sn. The pentavalent metallic element is at least one member selected from the group consisting of Nb, Ta, and Sb.

11 Claims, No Drawings

PIEZOELECTRIC CERAMIC COMPOSITION

BACKGROUND OF THE INVENTION

1. Field of the Invention

This invention relates to a piezoelectric ceramic composition that is widely utilized in the field of actuators, sensors, resonators, and the like.

2. Description of the Related Art

The piezoelectric materials (piezoelectric ceramic compositions) possess an effect of generating strain when an electric field is applied thereto from outside (conversion of electric energy to mechanical energy) and an effect of generating an electric charge on the surface thereof when stress is applied thereto from outside (conversion of mechanical energy to electric energy) and have been widely utilized in various fields in recent years. Such a piezoelectric material as lead titanate zirconate ($Pb(Zr, Ti)O_3$:PZT) excels in minute positional justification and finds utilization as in optical minute justification because it generates strain substantially proportional to the order of $1\times10^{-10}$ m/V in response to an applied voltage. In contrast thereto, the piezoelectric material is utilized also as a sensor for reading out minute force and deformation because it generates a large electric charge in proportion to the stress exerted thereon or the amount of deformation of itself caused by the stress. Further, since the piezoelectric material possesses excellent responsiveness, it is capable of enabling the piezoelectric material itself or an elastic body adapted for union with the piezoelectric material to be excited and consequently allowed to induce resonation therewith and, therefore, is utilized as a piezoelectric transformer, a supersonic motor, etc.

Most piezoelectric materials now available for practical applications are solid solution systems (PZT systems) consisting of $PbZrO_3$ (PZ)—$PbTiO_3$ (PT). The reason for this fact is that an excellent piezoelectric property can be obtained by using a composition nearing the morphotropic phase boundary (M.P.B.) of the rhombohedral crystal-based PZ and the tetragonal crystal-based PT. The PZT-based piezoelectric materials that are adapted to suit various uses in consequence of the addition of a varying auxiliary component or additive have been developed widely. They are varied to such an extent of embracing use as an actuator for positional justification requiring a large voltage coefficient (d) instead of manifesting a small mechanical factor of merit (Qm) and expected to produce a large displacement in the application using direct current and use as a supersonic wave generating device like a supersonic motor possessing a large mechanical factor of merit (Qm) instead of manifesting a small voltage coefficient (d) and suiting the way of using an alternating current.

Also other piezoelectric materials than the PZT-based materials have been developed for practical applications. They are mostly solid solutions that have as main components such lead-based perovskite compositions as lead magnate niobate [$Pb(Mg, Nb)O_3$:PMN].

The piezoelectric materials developed for practical applications are invariably lead-based piezoelectric materials as described above and have lead oxide (PbO) extremely rich in volatility even at low temperatures contained as a main component in a large amount nearing 60 to 70 mass %. PZT or PMN, for example, contains lead oxide in an amount of about $2/3$ in mass ratio. The lead-based piezoelectric materials that contain lead in such a large amount entail many problems such as environmental resistance like public nuisance and ecological unease. During the manufacture of a lead-based piezoelectric material, for example, an extremely large amount on the industrial level of lead oxide is suffered to volatilize and diffuse into the air in the step of a thermal treatment such as firing when the products are ceramic articles or melting when the products are single crystal articles. Though the lead oxide emitted in the step of manufacture may be recovered, the lead oxide contained in piezoelectric products marketed as commercial articles is difficult of recovery in the present situation. When this lead oxide is widely released in the environment, the elution of lead caused by acid rain arouses anxiety. In consideration of the spread of the fields of application of piezoelectric ceramic materials and single crystals and the growth of the amounts of their application, therefore, the liberation of lead from the piezoelectric materials proves to constitute an extremely important problem.

As piezoelectric materials that contain absolutely no lead, barium titanate ($BaTiO_3$) and bismuth-bedded ferroelectric materials have been known. The barium titanate, however, is devoid of serviceability in view of applications that involve joining with solder and mounting on a vehicle because it has such a low Curie point as 120° C. and suffers loss of piezoelectricity at a temperature exceeding it. On the other hand, the bismuth-bedded ferroelectric materials, though usually possessing a Curie point exceeding 400° C. and excelling in thermal stability, entail the problem in terms of productivity because it possesses large crystal anisotropy and requires spontaneous polarization to be oriented as by hot forging. Generally, the elimination of lead in a piezoelectric material leads to degradation of piezoelectric property. When the lead content is thoroughly eliminated from the conventional piezoelectric material, for example, it is judged that large piezoelectricity is obtained with difficulty.

Further, in search of a new piezoelectric material, studies have been being promoted on the sodium bismuth titanate-based materials in recent years. JP-B-4-60073 and JA Hei 11-180769, for example, disclose materials that contain sodium bismuth titanate and barium titanate and JP-A-11-171643 discloses materials that contain sodium bismuth titanate and potassium bismuth titanate. Then, JP-A-16-035350 discloses systems that contain sodium bismuth titanate and sodium bismuth, potassium bismuth titanate, and a third component.

These sodium bismuth titanate-based materials, however, fail to obtain sufficient piezoelectric property as compared with lead-based piezoelectric materials and consequently require further improvement in the piezoelectric property in the factual state of affairs. In this situation, the present patent applicant has proposed a piezoelectric ceramic material that contains a first compound possessing a rhombohedral crystal-based perovskite structure, a second compound possessing a tetragonal crystal-based perovskite structure, and a third compound including bismuth (Bi), a divalent metallic element such as magnesium (Mg), a tetravalent metallic element such as zirconium (Zr), and oxygen (O) (refer to JP-A-2005-47745, JP-A-2005-47746, and JP-A-2005-47748). He has also proposed a piezoelectric ceramic article that contains a first compound possessing a rhombohedral crystal-based perovskite structure, a second compound possessing a tetragonal crystal-based perovskite structure, and a third compound including bismuth, iron (Fe), a pentavalent metallic element like tantalum (Ta), and oxygen (O) (refer to JP-A-2005-47747). The piezoelectric ceramic articles disclosed in JP-A-2005-47745, JP-A-2005-47746, and JP-A-2005-47748 are capable of amply improving such piezoelectric properties as displacement and copiously enhancing the applicability of a non-lead-based piezoelectric material.

Incidentally, as piezoelectric materials, while materials abounding in piezoelectric constant (d) and manifesting large displacement are being sought, materials that possess a large Qm (mechanical factor of merit: index of energy loss) in applications involving an alternating current are being sought. In the resonator driven with high frequency, for example, the fact that a given piezoelectric material has small Qm constitutes a factor for generation of heat, for example. In the case of a piezoelectric device required to generate vibration of a large amplitude, the fact that the Qm of a given piezoelectric material is small possibly leads to destruction of the device.

As considered from the viewpoint of the Qm value mentioned above, the inventions disclosed in the foregoing patent documents have given virtually no study to the Qm value in the factual state of affairs. The inventions disclosed in the preceding patent documents invariably have placed emphasis on such displacement properties as piezoelectric constant (d). The piezoelectric ceramic articles disclosed in Patent Documents 5~8, for example, have given no study to the Qm.

SUMMARY OF THE INVENTION

This invention has been proposed in view of such factual state of affairs as mentioned above. It is aimed at providing a piezoelectric ceramic composition that has a large piezoelectric constant (d) and a large displacement and as well has a large Qm value.

For the purpose of accomplishing the object mentioned above, the piezoelectric ceramic composition of this invention is characterized by containing components constituting a composition corresponding to a solid solution that is composed of a first compound possessing a rhombohedral crystal-based perovskite structure, a second compound possessing a tetragonal crystal-based perovskite structure, and a third compound including Bi, Mn, a tetravalent metallic element or a pentavalent metallic element, and oxygen.

The aforementioned components that are contained in the piezoelectric ceramic composition of this invention equal what results from adding a third compound containing Mn as a component element to the combination of a first compound possessing a rhombohedral crystal-based perovskite structure and a second compound possessing a tetragonal crystal-based perovskite structure. The addition of the third compound containing Mn as a component element results in realizing a piezoelectric composition that contributes not only to improve the piezoelectric constant (d) but also to improve the Qm value and abounds in the piezoelectric constant and abounds in the Qm value.

This invention enables realization of a piezoelectric ceramic composition that abounds in the piezoelectric constant and in the Qm value and consequently enables provision of a piezoelectric device that abounds in displacement, for example, and represses heat generation and device destruction. Further, this invention is capable of realizing a piezoelectric ceramic composition that excels in repression of public nuisance, ecological resistance, and ecological viewpoint and promoting further active utilization of piezoelectric materials because it enables even a non-lead-based piezoelectric material to manifest a sufficient piezoelectric property and enables the emission of lead into the environment to be repressed.

DESCRIPTION OF THE PREFERRED EMBODIMENTS

Now, the mode of embodiment utilizing this invention will be described in detail.

The piezoelectric ceramic composition of this invention has as its basic composition a composition that corresponds to the combination of a first compound possessing a rhombohedral crystal-based perovskite structure and a second compound possessing a tetragonal crystal-based perovskite structure. By using as the basic composition the composition that corresponds to the aforementioned combination, it is made feasible to form a morphotropic phase boundary (M.P.B.) at least in part of the piezoelectric ceramic composition and realize an excellent piezoelectric property.

Here, the first compound is required to possess a rhombohedral crystal-based perovskite structure. Since the crystal structure of this compound is decided by the composition of the compound, it may be selected based on the composition. The question whether the compound possesses the rhombohedral crystal-based perovskite structure or not can be solved by subjecting a given compound to X-ray diffraction analysis and proving the results of this analysis based on the ASTM card.

As specific examples of the first compound, such compounds as sodium bismuth titanate ($Na_{0.5}Bi_{0.5}TiO_3$), lead zirconate ($PbZrO_3$), bismuth ferrite ($BiFeO_3$), $Pb(Sc_{1/2}Nb_{1/2})O_3$, $Pb(Fe_{1/2}-Nb_{1/2})O_3$, $Pb(Fe_{1/2}Ta_{1/2})O_3$, and $Pb(Zn_{1/3}Nb_{2/3})O_3$ may be cited. For the purpose of forming a non-lead-based piezoelectric material, however, the first compound is also preferred to be a compound not containing lead (Pb). The aforementioned sodium bismuth titanate (NBT) may well be termed a compound suitable as the first compound.

The sodium bismuth titanate is a compound that has sodium (Na) and bismuth (Bi) positioned at the A site of the perovskite structure and titan (Ti) positioned at the B site of the perovskite structure. In the sodium bismuth titanate, the molar ratio of the A site elements (Na, Bi) to the B site element (Ti) (hereinafter referred to as A/B ratio) is 1 in the stoichiometric composition, which is not limitative but allows a certain amount of deviation. When the sodium bismuth titanate is expressed by the general formula $(Na_{0.5}Bi_{0.5})_aTiO_3$ (wherein a denotes the A/B ratio), the A/B ratio that is not more than 1 enables the sintering property to be heightened and as well permits acquisition of a high piezoelectric property. The A/B ratio that falls in the range between not less than 0.85 and not more than 1.0 proves favorable because it enables acquisition of a still higher piezoelectric property. While the molar ratios of sodium and bismuth and the molar ratio of oxygen in the aforementioned general formula depend on the stoichiometric composition, these molar ratios allow a certain amount of deviation from the stoichiometric composition.

The first compound may be formed of one kind of compound and otherwise may be formed of a plurality of kinds of compound. When it is formed of a plurality of kinds of compound, these component compounds may or may not constitute a mutual solid solution. When the first compound is formed of a plurality of kinds of compound, the aforementioned A/B ratio is preferred to be not more than 1 and to be in the range between not less than 0.85 and not more than 1.0 in each of the component compounds. Otherwise, the value resulting from the arithmetic mean of the A/B ratio of the individual compound based on the composition is preferred to be not more than 1 or to be in the range between not less than 0.85 and not more than 1.0.

The second compound is a compound that possesses a tetragonal crystal-based perovskite structure. Since the crystal structure of a given compound is decided by the composition of the compound as described above, the compound possessing the tetragonal crystal-based perovskite may be selected based on this rule of decision. The question whether the second compound possesses the tetragonal crystal-based perovskite structure or not may be confirmed, similarly to the case of the rhombohedral crystal-based perovskite, by subjecting the compound to X-ray diffraction analysis and proving the results of this analysis based on the ASTM card.

As specific examples of the second compound, potassium bismuth titanate ($K_{0.5}Bi_{0.5}TiO_3$), barium titanate ($BaTiO_3$), lead titanate ($PbTiO_3$), $Pb(Mg_{1/3}Nb_{2/3})O_3$, $K_3Li_2Li_2$—$Nb_5O_{15}$, and $Sr_2KNb_5O_{15}$ may be cited. Even in the case of a compound that possesses the rhombohedral crystal-based perovskite structure, when the length of the a axis and the length of the b axis approximate each other, this compound may be regarded as possessing the aforementioned tetragonal crystal-based perovskite structure and used as such.

It is favorable to use, among these compounds, potassium bismuth titanate (KBT), barium titanate, or potassium bismuth titanate (KBT) as combined with barium titanate. The potassium bismuth titanate and the barium titanate are favorable in terms of characteristic properties because they are compounds containing no lead and are capable of depriving a piezoelectric ceramic composition of lead.

The aforementioned potassium bismuth titanate (KBT) is a compound that has potassium (K) and bismuth (Bi) positioned at the A site of the perovskite structure and titanium (Ti) positioned at the B site of the perovskite structure. In the potassium bismuth titanate, the molar ratio of the A site elements (K, Bi) to the B site element (Ti) (A/B ratio) is 1 in the stoichiometric composition, which is not limitative but allows a certain amount of deviation. When potassium bismuth titanate is expressed by the general formula $(K_{0.5}Bi_{0.5})_bTiO_3$ (wherein b denotes the A/B ratio), the A/B ratio that is not more than 1 is favorable because it is capable of heightening the sintering property and as well allowing acquisition of a high piezoelectric property and the A/B ration that is in the range between not less than 0.85 and not more than 1 is still more favorable because it is capable of allowing acquisition of a still higher piezoelectric property. Incidentally, the molar ratios of potassium and bismuth and the molar ratio of oxygen in the aforementioned general formula are derived from the stoichiometric composition. These molar ratios allow a certain amount of deviation from the stoichiometric composition.

The second compound also may be formed of one kind of compound or a plurality of kinds of compound. When it is formed of a plurality of kinds of compound, the component compounds may or may not form a mutual solid solution. When it is formed of a plurality of kinds of compound, the aforementioned A/B ratio in each of the component compounds is preferred to be not more than 1 and further to be in the range between not less than 0.85 and not more than 1.0 or the arithmetic mean of the A/B ratios of the component compounds based on the composition is preferred to be not more than 1 or further to be in the range between not less than 0.85 and not more than 1.0.

The piezoelectric ceramic composition of this invention is largely characterized by possessing a composition that corresponds to the case of adding a third compound as an additive to the aforementioned basic composition. The third compound is a composite oxide that contains Bi as the first component element, Mn as the second component element, and a tetravalent metallic element or a pentavalent metallic element as the third component element. It exists in the form of constituting a solid solution in the first compound or the second compound or both. By making the third compound contain Mn as a component element, it is made feasible to improve the Qm value vastly in the state of enabling piezoelectric properties such as piezoelectric constant to be retained intact.

Of the component elements constituting the aforementioned third compound, the third component element may be selected from the tetravalent metallic elements or the pentavalent metallic elements. The tetravalent metallic element is at least one member selected from the group consisting of Ti, Zr, Hf, and Sn. The pentavalent metallic element is at least one member selected from the group consisting of Nb, Ta, and Sb.

The composition of the aforementioned third compound (composite oxide) is expressed, when the third component element happens to be a tetravalent metallic element, by the general formula $Bi_c(Mn_{1/2}M^I_{1/2})O_3$. In this general formula, $M^I$ denotes a tetravalent metallic element (namely at least one member selected from the group consisting of Ti, Zr, Hf, and Sn). While the molar ratio c of Bi is 1 in the stoichiometric composition, it allows a certain amount of deviation. In the aforementioned general formula, the molar ratios of manganese (Mn) and a tetravalent metallic element $M^I$ and the molar ratio of oxygen are decided based on the stoichiometric composition. These molar ratios, similarly to the molar ratio of Bi, allow a certain amount of deviation from the stoichiometric composition.

When the third component element happens to be a pentavalent metallic element, the composition of the aforementioned third compound is expressed by the general formula $Bi_d(Mn_{2/3}M^{II}_{1/3})O_3$. In this general formula, $M^{II}$ denotes a pentavelent metallic element (namely, at least one member selected from the group consisting of Nb, Ta, and Sb). Though the molar ratio d of Bi is likewise 1 in this case, it allows a certain amount of deviation. The molar ratios of manganese (Mn) and a tetravalent metallic element and the molar ratio of oxygen in the aforementioned general formula are decided based on the stoichiometric composition. These molar ratios, similarly to the molar ratio of Bi, allow a certain amount of deviation.

The piezoelectric ceramic composition of this invention allows its composition to be expressed as converted into the first compound, the second compound, and the third component mentioned above. In this case, the ratio of the first compound and the second compound may be properly set as centered on the composition near the morphotropic phase boundary (M.P.B.) between the first compound possessing the rhombohedral crystal-based perovskite structure and the second compound possessing the tetragonal crystal-based perovskite structure.

As regards the first compound and the second compound, the overall A/B ratio is preferred to be not more then 1 and further not less than 0.85 and not more than 1. Specifically, the arithmetic mean of the A/B ratios of the first compound and the second compound as derived based on the composition is preferred to be not more than 1 and further to be in the range between not less than 0.85 and not more than 1.0. This fact is formularized as $(\alpha \cdot s+\beta \cdot t) \leq 1$ and further as $0.85 \leq (\alpha \cdot s+\beta \cdot t) \leq 1$ (wherein $\alpha+\beta=1$) providing that the molar ratio of the first compound is denoted by $\alpha$, the A/B ratio by s, and the molar ratio of the second compound by $\beta$. As already explained, a high sintering property and an excellent piezoelectric property can be obtained in this range.

The amount of the third component to be added may be properly set in consideration of characteristic properties. Concerning the specific composition including the third compound, the optimum range varies particularly with the kind of the second compound. When potassium bismuth titanate (KBT) is used as the second compound, for example, the piezoelectric ceramic composition of this invention can be expressed by the general formula $[(Na_xK_y)_{0.5}Bi_{(0.5x+0.5y+z)}]$

[Ti$_{(x+y)}$(Mn$_s$Me$_{(1-s)}$)$_z$]O$_3$ (wherein Me denotes at least one member selected from the group consisting of Ti, Zr, Hf, Sn, Nb, Ta, and Sb and S denotes ½ when Me=Ti, Zr, Hf, Sn or ⅔ when Me=Nb, Ta, Sb) and x corresponding to the molar ratio of the aforementioned first compound, y corresponding to the molar ratio of the aforementioned second compound, and z corresponding to the molar ratio of the aforementioned third compound are preferred to satisfy $0.76 \leq x \leq 0.91$, $0.08 \leq y \leq 0.23$, $0 \leq z \leq 0.05$, and $x+y+z=1$. When barium titanate is used as the second compound, the piezoelectric ceramic composition of this invention can be expressed by the general formula [Na$_{0.5x}$Ba$_y$Bi$_{(0.5x+z)}$][Ti$_{(x+y)}$(Mn$_s$Me$_{(1-s)}$)$_z$]O$_3$ (providing that Me in the formula denotes at least one member selected from the group consisting of Ti, Zr, Hf, Sn, Nb, Ta, and Sb and S denotes ½ when Me=Ti, Zr, Hf, and Sn or ⅔ when Me=Nb, Ta, and Sb) and x corresponding to the molar ratio of the aforementioned first compound, y corresponding to the molar ratio of the aforementioned second compound, and z corresponding to the molar ratio of the aforementioned third compound are preferred to satisfy $0.85 \leq x \leq 0.99$, $0 < y \leq 0.10$, $0 < z \leq 0.05$, and $x+y+z=1$.

Outside the range mentioned above, the piezoelectric properties are possibly degraded as set back from the morphotropic phase boundary (M.P.B.) between the first compound possessing the rhombohedral crystal-based perovskite structure and the second compound possessing the tetragonal crystal-based perovskite structure. When the molar ratio x of the first compound falls short of 0.76 and exceeds 0.91, for example, the dielectric constant and the piezoelectric property are degraded as set back from the morphotropic phase boundary (M.P.B.) formed by the first compound and the second compound. When the second compound is not contained, the piezoelectric properties are deficient because the morphotropic phase boundary (M.P.B.) is not formed. When the molar ratio of the second compound exceeds 0.23 (in the case of potassium bismuth titanate) or 0.10 (in the case of barium titanate), the dielectric constant and the piezoelectric property are degraded as set back from the morphotropic phase boundary (M.P.B.).

The piezoelectric properties are possibly degraded when the content of the third compound departs from the aforementioned range and unduly increases. Since the passage of the third compound into a solid solution in the first component or the second element is thought to exalt the piezoelectric properties, the third compound fails to form the solid solution but forms a heterogeneous phase and the piezoelectric properties are degraded by an increase of the amount of the heterogeneous phase when the molar ratio of the third compound exceeds 0.05.

The piezoelectric ceramic composition of this invention possesses a form that is equivalent to the solid solution resulting from mutual solution of at least part of the first compound, the second compound, and the third compound mentioned above. Specifically, the piezoelectric ceramic composition of this invention forms in at least part thereof the morphotropic phase boundary (M.P.B.) and consequently exalts the piezoelectric properties. Particularly, since the three-component system containing the third compound has the phase boundary (M.P.B.) formed therein, it is enabled to enhance such piezoelectric properties as dielectric constant, coefficient of electromechanical coupling, and displacement as compared with the one-component system or the two-component system. The average particle diameter of the crystal grains in the piezoelectric ceramic composition of this invention falls in the range of 0.5 μm to 20 μm, for example.

Though the piezoelectric ceramic composition of this invention is allowed to contain lead, the content of lead is preferred to avoid exceeding 1 mass % and more preferably equal absolute zero. When the composition is made to form a material totally devoid of lead, it proves favorable in terms of low air pollution and ecological resistance and from the ecological point of view because it is capable of repressing to the minimum the volatilization of lead during the course of firing and the emission of lead into the environment after the composition used in a piezoelectric article has been distributed to the market and eventually discarded.

The piezoelectric ceramic composition that is configured as described above can be manufactured as follows, for example.

First, powdered raw materials of bismuth oxide (Bi$_2$O$_3$), sodium carbonate (Na$_2$CO$_3$), potassium carbonate (K$_2$CO$_3$), titanium oxide (TiO$_2$), manganese carbonate (MnCO$_3$), zirconium oxide (ZrO$_2$), hafnium oxide (HfO$_2$), tin oxide (SnO$_2$), niobium oxide (Nb$_2$O$_5$), tantalum oxide (Ta$_2$O$_5$), etc are necessarily prepared as starting materials, thoroughly dried at a temperature of not lower than 100° C., and subsequently weighed in accordance with a composition aimed at. Incidentally, as raw materials, such materials as carbonates or oxalates that are converted by firing into oxides may be used as starting materials. Oxides or other compounds that are converted by firing into oxides may be used in the place of the carbonates.

Next, the weighed starting raw materials are thoroughly mixed by means of a ball mill in an organic solvent or in water for 5 hours~20 hours, thoroughly dried, shaped by pressing, and calcined at 750° C.~900° C. for approximately 1 hour~3 hours. Subsequently, the product of calcinations is pulverized by means of a ball mill in an organic solvent or in water for 5 hours~30 hours, then dried again, and made to add a binding solution and subjected to size enlargement. After the size enlargement, the product of size enlargement is shaped into a block by pressing.

The shaped block consequently obtained is subjected to a heat treatment performed at 400° C. to 800° C. for 2 to 4 hours till volatilization of the binder and subjected to main firing at 950° C. to 1300° C. for approximately 2 to 4 hours. The rate of temperature increase and the rate of temperature decrease during the course of this main firing are both approximately 50° C./hour~300° C./hour, for example. After the main firing, the resultant sinter is polished as occasion demands till it is furnished with an electrode. Thereafter, it is subjected to a polarizing treatment performed by application of an electric field of 5 MV/m to 10 MV/m for approximately 5 minutes to 1 hour in silicon oil kept at 25° C. to 150° C. As a result, a piezoelectric ceramic article formed of a piezoelectric ceramic composition is obtained and utilized as a piezoelectric device.

Since the piezoelectric ceramic composition of this invention has added thereto a third compound containing Mn as a component element in addition to a first compound possessing a rhombohedral crystal-based perovskite structure and a second compound possessing a tetragonal crystal-based perovskite structure as described in detail above, it is capable of improving such piezoelectric properties as dielectric constant, coefficient of electromechanical coupling, and displacement and as well improving the Qm value. The improvement of the Qm value leads to repressing loss and preventing a piezoelectric device from generation of heat and the device from breakage.

Further since the piezoelectric ceramic composition of this invention is capable of retaining excellent piezoelectric properties even when it is stripped of lead, it can vastly heighten possible availabilities. Specifically, it can repress to the minimum the volatilization of lead during the course of firing and the emission of lead into the environment after a piezoelectric part using the composition has been distributed to the market and eventually discarded. Thus, it is made possible to provide a veritably excellent piezoelectric ceramic composition in terms of low air pollution and ecological resistance and from the ecological viewpoint and promote extensive utility of piezoelectric ceramic compositions.

Though the mode of embodiment of this invention has been explained above, this invention is not limited to the preceding mode of embodiment as a matter of course but is allowed to undergo various alterations. In the aforementioned mode of embodiment, for example, though the case of exclusively containing the first compound, second compound, and third compound has been explained, the piezoelectric ceramic composition of this invention is allowed to contain other compound or element as impurity besides the three compounds. As concrete examples of the other element mentioned above, strontium (Sr), calcium (Ca), lithium (Li), tungsten (W), silicon (Si), boron (B), aluminum (Al), and rare-earth metals may be cited.

While the crystal structures of the first compound and the second compound have been explained in the aforementioned mode of embodiment, what possesses a composition corresponding to a solid solution containing sodium bismuth titanate and potassium bismuth titanate illustrated above qualifies as a piezoelectric ceramic composition of this invention without requiring discussion of the crystal structure of the piezoelectric ceramic composition.

Now, specific examples having applied this invention will be explained below based on results of experiments.

Experiment 1

This experiment tried manufacturing a piezoelectric ceramic formed of a piezoelectric ceramic composition that possessed a composition corresponding to a solid solution having sodium bismuth titanate (NBT) as a first compound, potassium bismuth titanate (KBT) as a second compound, and manganese-bismuth titanate (BMT) as a third compound.

Powdered bismuth oxide, powdered sodium carbonate, powdered potassium carbonate, powdered titanium oxide, and powdered manganese carbonate were prepared as the raw materials for the compounds mentioned above, thorough dried at a temperature exceeding 100° C., and weighed so as to constitute a stated composition. Then, the weighed starting raw materials were mixed by means of a ball mill in water for approximately 16 hours, then thoroughly dried, shaped by pressing, and calcined at 850° C. for approximately 2 hours. Subsequently, the product of this calcination was pulverized by means of a ball mill in water for approximately 16 hours, dried again, and subjected to size enlargement in the presence of an aqueous polyvinyl alcohol (PVA) solution serving as a binder.

Thereafter, the product of this size enlargement was shaped into disk-like pellets measuring 17 mm in diameter and 1.5 mm in thickness and the resultant pellets were subjected to a heat treatment performed at 700° C. for 2 hours for the purpose of volatizing the binder and subjected to main firing performed at 1100° C. to 1300° C. for 2 to 4 hours. As the firing conditions, the rate of temperature increase and the rate of temperature decrease were both set at 200° C./hour. Then, the product of this firing was polished into a plane-parallel plate having a thickness of approximately 0.4 mm to 0.6 mm and had silver paste baked thereon so as to form an electrode. The electrode was further subjected to a polarizing treatment performed by the application of an electric field of 10 MV/m in silicon oil kept at 50° C. to 150° C.

In accordance with the aforementioned method of manufacture, samples 1-1 to samples 1-68 were manufactured by having compounding ratios of starting raw materials so set that the compositions [molar ratios (expressed in mol % herein) of KBT, NBT, and BMT] converted to the relevant compounds in the piezoelectric ceramic composition (piezoelectric ceramic) subsequent to the firing assumed the values shown in Table 1-1 and Table 1-2. In the compositions mentioned above, $(Na_{0.5}Bi_{0.5})_{0.99}TiO_3$ was used as NBT, $(K_{0.5}Bi_{0.5})_{0.99}TiO_3$ was used as KBT, and $Bi(Mn_{1/2}Ti_{1/2})O_3$ was used as KBT. In NBT and KBT and the combination thereof, an A/B ratio=0.99 was used. In the sample 1-1 to the sample 1-12 having attached the * mark in Table 1 did not contain manganese-bismuth titanate (BMT) as a third compound and, therefore, were equivalent to comparative examples.

The samples 1-1 to the samples 1-68 consequently obtained were tested for specific conductivity $\in d$, coefficient of electromechanical coupling kr in the spreading angle, d33, and Qm. The specific conductivity $\in d$ was determined with an LCR meter (made by Hewlett Packard Co. and sold under the product code "HP4284A") and the coefficient kr of electromechanical coupling was determined by the resonance.anti-resonance method with an automatic measuring apparatus using an impedance analyzer (made by Hewlett Packard Co. and sold under the product code "HP4194A") and a desk-top computer. The determination of the d33 was performed with a d33 meter (made by Voice Laboratory of Chinese Science Agency and sold under the trademark "d33 meter"). The determination of the Qm was implemented with an impedance analyzer (made by Hewlett Packard Co. and sold under the product code "HP4194A") by the calculation of resonance, anti-resonance frequency, and series capacity and series resistance of an equivalent circuit by means of an automatic measuring apparatus using a desk-top computer. The compositions of the manufactured piezoelectric ceramics (compositions converted to relevant compounds; mol %) and the characteristic properties thereof were determined. The results of this determination are additionally shown in Table 1-1 and Table 1-2.

TABLE 1-1

| Sample No. | KBT | NBT | BMT | $\in d$ | kr(%) | d33(pC/N) | Qm |
|---|---|---|---|---|---|---|---|
| *1-1 | 8 | 92 | 0 | 383 | 12.0 | 76 | 272 |
| *1-2 | 9 | 91 | 0 | 401 | 14.5 | 80 | 318 |
| *1-3 | 10 | 90 | 0 | 445 | 17.3 | 84 | 332 |
| *1-4 | 11 | 89 | 0 | 483 | 19.3 | 88 | 326 |
| *1-5 | 12 | 88 | 0 | 524 | 22.5 | 94 | 298 |
| *1-6 | 13 | 87 | 0 | 542 | 25.2 | 100 | 230 |
| *1-7 | 14 | 86 | 0 | 588 | 27.5 | 107 | 184 |
| *1-8 | 16 | 84 | 0 | 696 | 30.7 | 122 | 149 |
| *1-9 | 18 | 82 | 0 | 819 | 31.8 | 135 | 113 |
| *1-10 | 20 | 80 | 0 | 1052 | 30.0 | 145 | 82 |
| *1-11 | 22 | 78 | 0 | 1324 | 18.4 | 80 | 77 |
| *1-12 | 23 | 77 | 0 | 1386 | 10.0 | 32 | 65 |
| 1-13 | 5 | 94 | 1 | 448 | 14.4 | 88 | 344 |
| 1-14 | 8 | 91 | 1 | 465 | 17.0 | 92 | 402 |
| 1-15 | 9 | 90 | 1 | 483 | 20.1 | 96 | 420 |
| 1-16 | 10 | 89 | 1 | 501 | 22.1 | 100 | 412 |
| 1-17 | 11 | 88 | 1 | 546 | 24.0 | 104 | 377 |
| 1-18 | 12 | 87 | 1 | 565 | 26.5 | 108 | 291 |
| 1-19 | 13 | 86 | 1 | 610 | 28.0 | 114 | 233 |
| 1-20 | 14 | 85 | 1 | 645 | 29.4 | 120 | 169 |
| 1-21 | 16 | 83 | 1 | 751 | 31.7 | 132 | 122 |
| 1-22 | 18 | 81 | 1 | 908 | 32.5 | 148 | 108 |
| 1-23 | 20 | 79 | 1 | 1154 | 31.3 | 170 | 103 |
| 1-24 | 22 | 77 | 1 | 1331 | 20.0 | 154 | 100 |
| 1-25 | 23 | 76 | 1 | 1441 | 17.9 | 144 | 98 |
| 1-26 | 24 | 75 | 1 | 1604 | 15.8 | 55 | 82 |
| 1-27 | 5 | 92 | 3 | 661 | 11.3 | 107 | 295 |
| 1-28 | 8 | 89 | 3 | 687 | 13.7 | 112 | 399 |
| 1-29 | 9 | 88 | 3 | 713 | 16.5 | 116 | 467 |

TABLE 1-1-continued

| Sample No. | KBT | NBT | BMT | ∈d | kr(%) | d33(pC/N) | Qm |
|---|---|---|---|---|---|---|---|
| 1-30 | 10 | 87 | 3 | 740 | 19.7 | 121 | 487 |
| 1-31 | 11 | 86 | 3 | 806 | 21.8 | 126 | 478 |
| 1-32 | 12 | 85 | 3 | 834 | 26.1 | 131 | 437 |
| 1-33 | 13 | 84 | 3 | 871 | 28.7 | 138 | 338 |
| 1-34 | 14 | 83 | 3 | 887 | 30.0 | 140 | 271 |
| 1-35 | 16 | 81 | 3 | 1109 | 32.1 | 160 | 243 |
| 1-36 | 18 | 79 | 3 | 1332 | 33.5 | 175 | 228 |
| 1-37 | 20 | 77 | 3 | 1902 | 32.5 | 154 | 190 |
| 1-38 | 22 | 75 | 3 | 1831 | 20.8 | 151 | 177 |
| 1-39 | 23 | 74 | 3 | 1721 | 18.6 | 109 | 170 |
| 1-40 | 24 | 73 | 3 | 1611 | 16.3 | 67 | 125 |

TABLE 1-2

| Sample No. | KBT | NBT | BMT | ∈d | kr(%) | d33(pC/N) | Qm |
|---|---|---|---|---|---|---|---|
| 1-41 | 5 | 90 | 5 | 1018 | 10.2 | 97 | 301 |
| 1-42 | 8 | 87 | 5 | 1058 | 12.4 | 101 | 422 |
| 1-43 | 9 | 86 | 5 | 1099 | 14.9 | 105 | 493 |
| 1-44 | 10 | 85 | 5 | 1140 | 17.8 | 110 | 515 |
| 1-45 | 11 | 84 | 5 | 1242 | 19.7 | 114 | 506 |
| 1-46 | 12 | 83 | 5 | 1285 | 23.6 | 118 | 462 |
| 1-47 | 13 | 82 | 5 | 1312 | 26.0 | 125 | 357 |
| 1-48 | 14 | 81 | 5 | 1367 | 27.2 | 127 | 286 |
| 1-49 | 16 | 79 | 5 | 1708 | 29.0 | 145 | 257 |
| 1-50 | 18 | 77 | 5 | 2052 | 30.3 | 158 | 241 |
| 1-51 | 20 | 75 | 5 | 2131 | 29.4 | 140 | 201 |
| 1-52 | 22 | 73 | 5 | 2221 | 18.8 | 136 | 188 |
| 1-53 | 23 | 72 | 5 | 2001 | 16.9 | 98 | 180 |
| 1-54 | 24 | 71 | 5 | 1782 | 15.0 | 60 | 125 |
| 1-55 | 5 | 89 | 6 | 1064 | 9.2 | 71 | 211 |
| 1-56 | 8 | 86 | 6 | 1050 | 11.2 | 76 | 295 |
| 1-57 | 9 | 85 | 6 | 1091 | 13.5 | 79 | 345 |
| 1-58 | 10 | 84 | 6 | 1131 | 16.1 | 82 | 360 |
| 1-59 | 11 | 83 | 6 | 1233 | 17.8 | 85 | 354 |
| 1-60 | 12 | 82 | 6 | 1276 | 21.3 | 89 | 324 |
| 1-61 | 13 | 81 | 6 | 1300 | 23.4 | 94 | 250 |
| 1-62 | 14 | 80 | 6 | 1357 | 24.5 | 95 | 200 |
| 1-63 | 16 | 78 | 6 | 1696 | 26.2 | 108 | 180 |
| 1-64 | 18 | 76 | 6 | 1717 | 27.3 | 119 | 169 |
| 1-65 | 20 | 74 | 6 | 1710 | 26.6 | 126 | 140 |
| 1-66 | 22 | 72 | 6 | 1736 | 17.0 | 74 | 131 |
| 1-67 | 23 | 71 | 6 | 1708 | 15.4 | 64 | 126 |
| 1-68 | 24 | 70 | 6 | 1680 | 13.9 | 54 | 88 |

It is clear from Tables 1-1 and 1-2 that the samples containing a third compound (Samples from 1-13 to 1-68: equivalent to working examples) had characteristic properties thereof improved as compared with comparative examples (Samples from 1-1 to 1-12) containing no third compound.

Degradation of individual characteristic properties was seen in Sample 1-13 which had the molar ratio of the first compound (NBT) exceed 0.91 (91 mol %), Samples 1-27 and 1-41 which had the molar ratios of the second compound (KBT) fall short of 0.08 (8 mol %), Samples 1-26, 1-40, and 1-54 which had the molar ratios of the second compound exceed 0.23 (23 mol %0, and Samples 1-55 to 1-68 which had the molar ratios of the third compound (BMT) exceed 0.05 (5 mol %). It follows, therefore, that in the NBT-KBT-BMT-based piezoelectric ceramic compositions, the molar ratio x of NBT, the molar ratio y of KBT, and the molar ratio z of BMT were preferred to satisfy $0.76 \leq x \leq 0.91$, $0.08 \leq y \leq 0.23$, $0 < z \leq 0.05$, and $x+y+z=1$. Particularly, the conditions kr=not less than 30%, d33=not less than 100 pC/N, and Qm=not less than 200 were fulfilled by satisfying $0.77 \leq x \leq 0.89$, $0.08 \leq y \leq 0.22$, $0.01 \leq z \leq 0.05$, and $x+y+z=1$. The conditions The conditions kr=not less than 30%, d33=not less than 150 pC/N, and Qm=not less than 200 were realized in Samples 1-35 and 1-36, for example, by optimizing the compositions thereof.

Experiment 2

Piezoelectric ceramics (Samples 2-1, 2-2) were manufactured by following the procedure of Experiment 1 excepting use of manganese-bismuth zirconate (BMZ) (Zr, a tetravalent metallic element, as a third component element) as a third compound in the place of manganese-bismuth titanate (BMT). Piezoelectric ceramics (Samples 2-3, 2-4) were manufactured by following the procedure of Experiment 1 excepting use of manganese-bismuth hafnium acid (BMHf) (Hf, a tetravalent metallic element, as a third component element) as a third compound in the place of manganese-bismuth titanate (BMT). Further, piezoelectric ceramics (Samples 2-5, 2-6) were manufactured by following the procedure of Experiment 1 excepting use of manganese.bismuth stannate (BMSn) (Sn, a tetravalent metallic element, as a third component element) as a third compound in the place of manganese-bismuth titanate (BMT). These piezoelectric ceramics were tested for specific conductivity ∈d, coefficient kr of electromechanical coupling in the spreading angle, d33, and Qm by following the procedure of Experiment 1. The compositions of the manufactured piezoelectric ceramics (compositions converted to relevant compounds: mol %) and the characteristic properties thereof were measured. The results of this measurement are shown in Tables 2-1 to 2-3.

TABLE 2-1

| Sample No. | KBT | NBT | BMZ | ∈d | kr(%) | d33(pC/N) | Qm |
|---|---|---|---|---|---|---|---|
| 2-1 | 18 | 81 | 1 | 1008 | 34.3 | 155 | 218 |
| 2-2 | 18 | 77 | 5 | 2278 | 32.0 | 165 | 284 |

TABLE 2-2

| Sample No. | KBT | NBT | BMHf | ∈d | kr(%) | d33(pC/N) | Qm |
|---|---|---|---|---|---|---|---|
| 2-3 | 18 | 81 | 1 | 1110 | 32.3 | 160 | 210 |
| 2-4 | 18 | 77 | 5 | 2470 | 31.5 | 168 | 266 |

TABLE 2-3

| Sample No. | KBT | NBT | BMSn | ∈d | kr(%) | d33(pC/N) | Qm |
|---|---|---|---|---|---|---|---|
| 2-5 | 18 | 81 | 1 | 998 | 32.3 | 145 | 230 |
| 2-6 | 18 | 77 | 5 | 2060 | 32.1 | 158 | 295 |

Also regarding the samples using BMZ, BMHf, and BMSn as third compounds, they showed a vast improvement in characteristic properties as compared with Sample 1-9 that equaled the compositions of NBT and KBT, for example, and contained neither BMT nor BMZ. They clearly tended to abound in the effect of improving characteristic properties (particularly the effect of inducing an improvement in Qm) as compared with Sample 1-22 and Sample 1-50 that used BMT and possessed equal compositions.

Experiment 3

In this experiment, piezoelectric ceramics (Samples 3-1 to 3-7) were manufactured by following the procedure of Experiment 1 excepting variation of the A/B ratio of NBT and KBT. Similarly, regarding the case of containing no BMT, piezoelectric ceramics (Samples 3-8 to 3-12: equivalent to comparative examples) were manufactured by following the procedure of Experiment 1 excepting variation of the A/B ratio of NBT and KBT. Though the A/B ratio was a value that concerned NBT and KBT, the same A/B ratio applied to the combination of NBT and KBT because the A/B ratio of NBT and KBT had the same value.

The manufactured piezoelectric ceramics were tested for specific conductivity ∈d, coefficient kr of electromechanical coupling in the spreading angle, d33, and Qm by following the procedure of Experiment 1. The compositions of the manufactured piezoelectric ceramics (the compositions converted to individual compounds: mol %) and the results of determination of the overall A/B ratios and the characteristic properties of the first compounds and the second compounds are shown in Table 3.

TABLE 3

| Sample No. | KBT | NBT | BMT | A/B | ∈d | kr(%) | d33(pC/N) | Qm |
|---|---|---|---|---|---|---|---|---|
| 3-1 | 18 | 81 | 1 | 1.01 | 905 | 22.4 | 97 | 335 |
| 3-2 | 18 | 81 | 1 | 1 | 933 | 34.0 | 154 | 221 |
| 3-3 | 18 | 81 | 1 | 0.99 | 1013 | 34.5 | 167 | 218 |
| 3-4 | 18 | 81 | 1 | 0.95 | 976 | 32.8 | 154 | 229 |
| 3-5 | 18 | 81 | 1 | 0.9 | 891 | 31.4 | 139 | 240 |
| 3-6 | 18 | 81 | 1 | 0.85 | 821 | 27.6 | 119 | 273 |
| 3-7 | 18 | 81 | 1 | 0.8 | 811 | 24.8 | 95 | 205 |
| *3-8 | 18 | 82 | 0 | 1 | 755 | 31.3 | 124 | 135 |
| *3-9 | 18 | 82 | 0 | 0.99 | 819 | 31.8 | 135 | 113 |
| *3-10 | 18 | 82 | 0 | 0.95 | 789 | 30.2 | 124 | 125 |
| *3-11 | 18 | 82 | 0 | 0.9 | 721 | 28.9 | 112 | 138 |
| *3-12 | 18 | 82 | 0 | 0.85 | 664 | 25.4 | 96 | 150 |

In Samples 3-1 to 3-7 that contained BMT, all the samples invariably showed improvements in their characteristic properties as compared with the comparative examples containing no BMT (Samples 3-8 to 3-12). Particularly, the improvement in Qm was prominent. Further, by having the overall A/B ratio of the first compound and the second compound fall short of 1, improvements appeared in coefficient kr of electromechanical coupling, piezoelectric constant d33, and Qm value.

In contrast, when the aforementioned A/B ratio exceeded 1, degradations appeared in the coefficient kr of electromechanical coupling and the piezoelectric constant d33 while an increase appeared in the Qm value. This fact is logically explained by supposing that the produced piezoelectric ceramics suffered degradation of the sintering property, failed to exalt density, and allowed no application of high voltage during the course of polarization. On the other hand, degradations showed in the coefficient kr of electromechanical coupling, the piezoelectric constant d33, and the Qm value when the aforementioned A/B was set at 0.8. This fact may be logically explained by supposing that Ti as a B site element was left behind plenty and a heterogeneous phase was consequently induced when the aforementioned A/B ratio was unduly small. The formation of a heterogeneous phase led to degradation of piezoelectric properties.

The results of the aforementioned experiment ascertain that such piezoelectric properties as the amount of displacement were improved by satisfying the condition $0.85 \leq (\alpha \cdot s + \beta \cdot t) \leq 1$ (providing that $\alpha + \beta = 1$) when the molar ratio of the first compound was denoted by $\alpha$, the A/B ration by s, and the molar ratio of the second compound by $\beta$, and the A/B ratio was set at 1.

Experiment 4

In this experiment, piezoelectric ceramics were manufactured by following the procedure of Experiment 1 excepting use of barium titanate (BT) instead as a second compound and the manufactured piezoelectric ceramics were tested for specific conductivity ∈d, coefficient kr of electromechanical coupling in the spreading angle, d33, and Qm by following the procedure of Experiment 1. The results of determination of compositions (compositions converted to individual compounds: mol %) and the characteristic properties of the manufactured piezoelectric ceramics are shown in Table 4.

TABLE 4

| Sample No. | NBT | BT | BMT | ∈d | kr(%) | d33(pC/N) | Qm |
|---|---|---|---|---|---|---|---|
| 4-1 | 94 | 1 | 1 | 1136 | 31.1 | 149 | 344 |
| 4-2 | 92 | 1 | 3 | 1184 | 31.0 | 155 | 295 |
| 4-3 | 90 | 1 | 5 | 1010 | 28.3 | 131 | 301 |
| 4-4 | 89 | 1 | 6 | 931 | 23.0 | 103 | 211 |
| 4-5 | 94 | 5 | 1 | 1209 | 30.5 | 155 | 275 |
| 4-6 | 92 | 5 | 3 | 1260 | 30.4 | 161 | 236 |
| 4-7 | 90 | 5 | 5 | 1074 | 27.7 | 136 | 241 |
| 4-8 | 89 | 5 | 6 | 990 | 22.5 | 107 | 169 |
| 4-9 | 89 | 10 | 1 | 1282 | 29.9 | 161 | 220 |
| 4-10 | 87 | 10 | 3 | 1336 | 29.8 | 167 | 189 |
| 4-11 | 85 | 10 | 5 | 1138 | 27.1 | 141 | 193 |
| 4-12 | 84 | 10 | 6 | 1049 | 22.1 | 111 | 135 |
| *4-13 | 95 | 5 | 0 | 1110 | 25.1 | 114 | 352 |
| *4-14 | 90 | 10 | 0 | 1180 | 24.0 | 119 | 425 |

Also when BT was used as a second compound, improvements of piezoelectric properties and Qm value appeared in Samples 4-1 to 4-12 containing BMT as compared with Samples 4 13 and 4-14 (corresponding to comparative experiments) containing no BMT. Since degradations of piezoelectric characteristics appeared in Samples 4-4, 4-8, and 4-12 having BMT exceed 5 mol %, it may be concluded favorable that when BT was used as a third compound, the conditions $0.85 \leq x \leq 0.99$, $0 < y \leq 0.10$, and $0 < z \leq 0.05$, providing that x denotes the molar ratio of NBT, y the molar ratio of BT, and z the molar ratio of BMT, were satisfied.

Experiment 5

Piezoelectric ceramics (Samples 5-1 to 5-68) were manufactured by following the procedure of Experiment 1 excepting use of manganese-bismuth niobate (BMN) (Nb, a tetravalent metallic element, as a third element) as a third compound in the place of manganese-bismuth titanate (BMT). Incidentally, Samples 5-1 to 5-12 (samples having attached a * mark) among the samples mentioned above corresponded to comparative examples because they did not contain BMN.

The manufactured piezoelectric ceramics were tested for specific conductivity ∈d, coefficient kr of electromechanical coupling, d33, and Qm by following the procedure of Experiment 1. The results of determination of compositions (compositions converted into relevant compounds: mol %) and the characteristic properties of the manufactured piezoelectric ceramics are shown in Tables 5-1 and 5-2.

TABLE 5-1

| Sample No. | KBT | NBT | BMN | ∈d | kr(%) | d33(pC/N) | Qm |
|---|---|---|---|---|---|---|---|
| *5-1 | 8 | 92 | 0 | 383 | 12.0 | 76 | 272 |
| *5-2 | 9 | 91 | 0 | 401 | 14.5 | 80 | 318 |
| *5-3 | 10 | 90 | 0 | 445 | 17.3 | 84 | 332 |
| *5-4 | 11 | 89 | 0 | 483 | 19.3 | 88 | 326 |
| *5-5 | 12 | 88 | 0 | 524 | 22.5 | 94 | 298 |
| *5-6 | 13 | 87 | 0 | 542 | 25.2 | 100 | 230 |
| *5-7 | 14 | 86 | 0 | 588 | 27.5 | 107 | 184 |
| *5-8 | 16 | 84 | 0 | 696 | 30.7 | 122 | 149 |
| *5-9 | 18 | 82 | 0 | 819 | 31.8 | 135 | 113 |
| *5-10 | 20 | 80 | 0 | 1052 | 30.0 | 145 | 82 |
| *5-11 | 22 | 78 | 0 | 1324 | 18.4 | 80 | 77 |
| *5-12 | 23 | 77 | 0 | 1386 | 10.0 | 32 | 65 |
| 5-13 | 5 | 94 | 1 | 457 | 8.6 | 94 | 294 |
| 5-14 | 8 | 91 | 1 | 555 | 18.5 | 103 | 343 |
| 5-15 | 9 | 90 | 1 | 576 | 21.7 | 107 | 359 |
| 5-16 | 10 | 89 | 1 | 598 | 23.7 | 112 | 352 |
| 5-17 | 11 | 88 | 1 | 651 | 25.6 | 116 | 322 |
| 5-18 | 12 | 87 | 1 | 674 | 28.1 | 121 | 248 |
| 5-19 | 13 | 86 | 1 | 728 | 29.6 | 127 | 199 |

TABLE 5-1-continued

| Sample No. | KBT | NBT | BMN | ∈d | kr(%) | d33(pC/N) | Qm |
|---|---|---|---|---|---|---|---|
| 5-20 | 14 | 85 | 1 | 769 | 31.0 | 134 | 161 |
| 5-21 | 16 | 83 | 1 | 863 | 32.7 | 147 | 152 |
| 5-22 | 18 | 81 | 1 | 1013 | 34.5 | 167 | 142 |
| 5-23 | 20 | 79 | 1 | 1377 | 33.3 | 180 | 138 |
| 5-24 | 22 | 77 | 1 | 1588 | 21.3 | 172 | 133 |
| 5-25 | 23 | 76 | 1 | 1719 | 13.3 | 161 | 115 |
| 5-26 | 24 | 75 | 1 | 2152 | 5.4 | 61 | 108 |
| 5-27 | 5 | 92 | 3 | 760 | 6.6 | 100 | 317 |
| 5-28 | 8 | 89 | 3 | 819 | 14.6 | 115 | 371 |
| 5-29 | 9 | 88 | 3 | 851 | 17.6 | 120 | 387 |
| 5-30 | 10 | 87 | 3 | 882 | 20.9 | 125 | 380 |
| 5-31 | 11 | 86 | 3 | 962 | 23.0 | 131 | 348 |
| 5-32 | 12 | 85 | 3 | 995 | 27.5 | 136 | 268 |
| 5-33 | 13 | 84 | 3 | 1002 | 29.6 | 144 | 215 |
| 5-34 | 14 | 83 | 3 | 990 | 31.9 | 148 | 173 |
| 5-35 | 16 | 81 | 3 | 1322 | 34.1 | 159 | 162 |
| 5-36 | 18 | 79 | 3 | 1589 | 34.5 | 166 | 151 |
| 5-37 | 20 | 77 | 3 | 2269 | 29.1 | 163 | 147 |
| 5-38 | 22 | 75 | 3 | 2456 | 17.1 | 157 | 131 |
| 5-39 | 23 | 74 | 3 | 2309 | 16.3 | 113 | 127 |
| 5-40 | 24 | 73 | 3 | 2161 | 14.8 | 69 | 110 |

TABLE 5-2

| Sample No. | KBT | NBT | BMN | ∈d | kr(%) | d33(pC/N) | Qm |
|---|---|---|---|---|---|---|---|
| 5-41 | 5 | 90 | 5 | 1215 | 14.2 | 98 | 343 |
| 5-42 | 8 | 87 | 5 | 1262 | 16.3 | 113 | 401 |
| 5-43 | 9 | 86 | 5 | 1311 | 19.0 | 118 | 418 |
| 5-44 | 10 | 85 | 5 | 1359 | 22.0 | 123 | 411 |
| 5-45 | 11 | 84 | 5 | 1428 | 23.5 | 127 | 375 |
| 5-46 | 12 | 83 | 5 | 1434 | 28.2 | 129 | 290 |
| 5-47 | 13 | 82 | 5 | 1565 | 30.8 | 127 | 232 |
| 5-48 | 14 | 81 | 5 | 1631 | 32.0 | 137 | 187 |
| 5-49 | 16 | 79 | 5 | 2037 | 26.7 | 157 | 173 |
| 5-50 | 18 | 77 | 5 | 2533 | 24.5 | 161 | 161 |
| 5-51 | 20 | 75 | 5 | 2530 | 22.9 | 143 | 156 |
| 5-52 | 22 | 73 | 5 | 2641 | 18.6 | 139 | 140 |
| 5-53 | 23 | 72 | 5 | 2370 | 15.9 | 100 | 135 |
| 5-54 | 24 | 71 | 5 | 2099 | 13.5 | 61 | 116 |
| 5-55 | 5 | 89 | 6 | 1269 | 9.9 | 63 | 308 |
| 5-56 | 8 | 86 | 6 | 1253 | 11.8 | 84 | 361 |
| 5-57 | 9 | 85 | 6 | 1301 | 14.2 | 88 | 376 |
| 5-58 | 10 | 84 | 6 | 1350 | 16.6 | 91 | 370 |
| 5-59 | 11 | 83 | 6 | 1418 | 18.9 | 97 | 338 |
| 5-60 | 12 | 82 | 6 | 1423 | 22.6 | 94 | 261 |
| 5-61 | 13 | 81 | 6 | 1551 | 24.9 | 105 | 209 |
| 5-62 | 14 | 80 | 6 | 1619 | 18.1 | 106 | 169 |
| 5-63 | 16 | 78 | 6 | 2023 | 15.9 | 120 | 128 |
| 5-64 | 18 | 76 | 6 | 2096 | 15.2 | 121 | 118 |
| 5-65 | 20 | 74 | 6 | 2106 | 14.2 | 122 | 113 |
| 5-66 | 22 | 72 | 6 | 2073 | 12.6 | 76 | 108 |
| 5-67 | 23 | 71 | 6 | 2107 | 10.1 | 67 | 104 |
| 5-68 | 24 | 70 | 6 | 2143 | 10.0 | 55 | 96 |

Also when BMN was used as a third compound, improvements of piezoelectric properties and Qm appeared in Samples 5-13 to 5-68 containing BMT as compared with Samples 5-1 to 5-12 containing no BMN. Degradations of individual properties appeared in Samples 5-13 having molar ratios of the first compound (NBT) exceed 0.91 (91 mol %), Samples 5-2 to 5-41 having molar ratios of the second compound (KBT) fall short of 0.08 (8 mol %), Samples 5-26, 5-40, 5-54 having molar ratios of the second compound (KBT) exceed 0.23 (23 mol %), and Samples 5-55 to 5-68 having molar ratios of the third compound (BMN) exceed 0.05 (5 mol %). The NBT-KBT-BMN-based piezoelectric ceramic compositions, therefore, were also preferred to satisfy the conditions $0.76 \leq x \leq 0.91$, $0.08 \leq y \leq 0.23$, $0 < z \leq 0.05$, and $x+y+z=1$ providing that x denotes the molar ratio of NBT, y the molar ratio of KBT, and z the molar ratio of BMN.

Experiment 6

Piezoelectric ceramics (Samples 6-1, 6-2) were manufactured by following the procedure of Experiment 1 excepting use of manganese-bismuth tantalate (BMTa) (Ta, a tetravalent metallic element, as a third component element) as the third compound in the place of manganese-bismuth niobate (BMN). Further, piezoelectric ceramics (Samples 6-3, 6-4) were manufactured by following the procedure of Experiment 1 excepting use of manganese-bismuth antimonate (BMSb) (Sb, a pentavalent metallic element, as a third component element) as the third compound in the place of manganese-bismuth niobate (BMN). These piezoelectric ceramics were tested for specific conductivity ∈d, coefficient kr of electromechanical coupling in the spreading angle, d33, and Qm by following the procedure of Experiment 1. The results of determination of the compositions (compositions converted to individual compounds: mol %) and the characteristic properties of the manufactured piezoelectric ceramics are shown in Table 6-1 and Table 6-2.

TABLE 6-1

| Sample No. | KBT | NBT | BMTa | ∈d | kr(%) | d33(pC/N) | Qm |
|---|---|---|---|---|---|---|---|
| 6-1 | 18 | 81 | 1 | 1008 | 34.3 | 155 | 145 |
| 6-2 | 18 | 77 | 5 | 2520 | 24.3 | 150 | 172 |

TABLE 6-2

| Sample No. | KBT | NBT | BMSb | ∈d | kr(%) | d33(pC/N) | Qm |
|---|---|---|---|---|---|---|---|
| 6-3 | 18 | 81 | 1 | 998 | 33.3 | 148 | 175 |
| 6-4 | 18 | 77 | 5 | 2320 | 25.2 | 156 | 190 |

Ample improvements of characteristic properties appeared in the samples using BMT and BMSb as third compounds as compared with the Sample 5-9 that had the compositions of NBT and KBT equal and not contained BMN, BMTa, and BMSb. It is evident that these samples tended to show appreciably larger effects of improving characteristic properties (particularly the effect of improving Qm) as compared with the Sample 5-22 and the Sample 5-50 that were made to possess equal compositions by using BMN.

Experiment 7

In this experiment, piezoelectric ceramics were manufactured by following the procedure of Experiment 5 excepting variation of the A/B ratio of NBT and KBT. Also in the case of containing no BMN, piezoelectric ceramics (Samples 7-8 to 7-12: corresponding to comparative examples) were similarly manufactured excepting variation of the A/B ratio of NBT and KBT. Though the A/B ratio was a value concerning NBT and KBT, the same A/B ratio applied to the combination of NBT and KBT because the values of the A/B ratio of NBT and KBT were equal.

The manufactured piezoelectric ceramics were tested for specific conductivity ∈d, coefficient kr of electromechanical coupling, d33, and Qm by following the procedure of Experiment 1. The results of determination of the compositions (compositions converted to the individual compounds: mol %), the overall A/B ratios of the first compound and the second compound, and the characteristic properties of the manufactured piezoelectric ceramics are shown in Table 7.

TABLE 7

| Sample No. | KBT | NBT | BMN | A/B | ∈d | kr(%) | d33(pC/N) | Qm |
|---|---|---|---|---|---|---|---|---|
| 7-1 | 18 | 81 | 1 | 1.01 | 905 | 22.4 | 97 | 218 |
| 7-2 | 18 | 81 | 1 | 1 | 933 | 34.0 | 154 | 144 |
| 7-3 | 18 | 81 | 1 | 0.99 | 1013 | 34.5 | 167 | 142 |
| 7-4 | 18 | 81 | 1 | 0.95 | 976 | 32.8 | 154 | 149 |
| 7-5 | 18 | 81 | 1 | 0.9 | 891 | 31.4 | 139 | 156 |
| 7-6 | 18 | 81 | 1 | 0.85 | 821 | 27.6 | 119 | 178 |
| 7-7 | 18 | 81 | 1 | 0.8 | 811 | 24.8 | 95 | 134 |
| *7-8 | 18 | 82 | 0 | 1 | 755 | 31.3 | 124 | 135 |
| *7-9 | 18 | 82 | 0 | 0.99 | 819 | 31.8 | 135 | 113 |
| *7-10 | 18 | 82 | 0 | 0.95 | 789 | 30.2 | 124 | 125 |
| *7-11 | 18 | 82 | 0 | 0.9 | 721 | 28.9 | 112 | 138 |
| *7-12 | 18 | 82 | 0 | 0.85 | 664 | 25.4 | 96 | 150 |

As Table 7 clearly shows, improvements of coefficient kr of electromechanical coupling, piezoelectric constant d33, and Qm value were made to appear by having the A/B ratios of the first compound and the second compound fall short of 1. In contrast, degradations of the coefficient kr of electromechanical coupling and the piezoelectric constant d33 appeared despite an increase of the Qm value when the aforementioned A/B exceeded 1. This fact may be logically explained by supposing that the produced piezoelectric ceramics suffered degradation of the sintering property, failed to exalt density, and allowed no application of high voltage during the course of polarization when the aforementioned A/B ratios exceeded 1. In contrast, when the aforementioned A/B ratio was set at 0.8, degradations invariably appeared in the coefficient kr of electromechanical coupling, the piezoelectric constant d33, and the Qm value. This fact may be logically explained by supposing that Ti as a B site element was left behind plenty and a heterogeneous phase was consequently induced when the aforementioned A/B ratio was unduly small. The formation of a heterogeneous phase led to degradations of the piezoelectric properties.

The results of the aforementioned experiment ascertain that even in the case of using BMTa as a third compound, such piezoelectric properties as the amount of displacement were improved by satisfying the condition $0.85 \leq (\alpha \cdot s + \beta \cdot t) \leq 1$ when the molar ratio of the first compound was denoted by $\alpha$, the molar ratio of the second compound by $\beta$, and the A/B ratio by s (providing that $\alpha + \beta = 1$).

Experiment 8

In this experiment, piezoelectric ceramics were manufactured by following the procedure of Experiment 5 excepting use of barium titanate (BT) as a second compound and the manufactured piezoelectric ceramics were tested for specific conductivity ∈d, coefficient kr of electromechanical coupling in the spreading angle, d33, and Qm by following the procedure of Experiment 1. The results of determination of the compositions (compositions converted to individual compounds: mol %) and the characterized properties of the manufactured piezoelectric ceramics are shown in Table 8.

TABLE 8

| Sample No. | NBT | BT | BMN | ∈d | kr(%) | d33(pC/N) | Qm |
|---|---|---|---|---|---|---|---|
| 8-1 | 94 | 1 | 1 | 1197 | 33.0 | 161 | 447 |
| 8-2 | 92 | 1 | 3 | 1247 | 32.9 | 167 | 384 |
| 8-3 | 90 | 1 | 5 | 1153 | 30.0 | 141 | 392 |
| 8-4 | 89 | 1 | 6 | 980 | 24.3 | 111 | 275 |
| 8-5 | 94 | 5 | 1 | 1330 | 32.3 | 167 | 358 |
| 8-6 | 92 | 5 | 3 | 1386 | 32.2 | 174 | 307 |
| 8-7 | 90 | 5 | 5 | 1281 | 29.4 | 147 | 313 |
| 8-8 | 89 | 5 | 6 | 1089 | 23.9 | 116 | 220 |
| 8-9 | 89 | 10 | 1 | 1410 | 31.7 | 174 | 286 |
| 8-10 | 87 | 10 | 3 | 1470 | 31.6 | 177 | 246 |
| 8-11 | 85 | 10 | 5 | 1352 | 28.7 | 152 | 251 |
| 8-12 | 84 | 10 | 6 | 1154 | 23.4 | 120 | 176 |
| *8-13 | 95 | 5 | 0 | 1110 | 25.1 | 114 | 352 |
| *8-14 | 90 | 10 | 0 | 1180 | 24.0 | 119 | 425 |

Even in the case of using BT as a second compound, improvements of the piezoelectric property and Qm appeared in the Samples 8-1 to 8-12 that contained BMN as compared with the Samples 8-13 and 8-14 (corresponding to comparative examples). The Samples 8-4, 8-8, and 8-12 that had BMT exceed 5 mol %, however, showed degradations of piezoelectric properties. When BT was used as a third compound, therefore, it was concluded favorable to satisfy the conditions $0.85 \leq x \leq 0.99$, $0 < y \leq 0.10$, and $0 < z \leq 0.05$, providing that the molar ratio of NBT is denoted by x, the molar ratio of BT by y, and the molar ratio of BMN by z.

What is claimed is:

1. A piezoelectric ceramic composition comprising components constituting a composition corresponding to a solid solution consisting of a first compound possessing a rhombohedral system-based perovskite structure, a second compound possessing a tetragonal system-based perovskite structure, and a third compound including Bi, Mn, a tetravalent metallic element or a pentavalent metallic element, and oxygen, wherein said first compound is sodium bismuth titanate.

2. A piezoelectric ceramic composition according to claim 1, wherein said tetravalent metallic element is at least one element selected from among Ti, Zr, Hf, and Sn.

3. A piezoelectric ceramic composition according to claim 1, wherein said pentavalent metallic element is at least one element selected from among Nb, Ta, and Sb.

4. A piezoelectric ceramic composition comprising components constituting a composition corresponding to a solid solution consisting of a first compound possessing a rhombohedral system-based perovskite structure, a second compound possessing a tetragonal system-based perovskite structure, and a third compound including Bi, Mn, a tetravalent metallic element or a pentavalent metallic element, and oxygen, wherein said second compound is potassium bismuth titanate.

5. A piezoelectric ceramic composition according to claim 4, wherein the composition is expressed by a general formula $[(Na_xK_y)_{0.5}Bi_{(0.5x+0.5y+z)}][Ti_{(x+y)}(Mn_sMe_{(1-s)})_z]O_3$ (wherein Me denotes at least one element selected from among Ti, Zr, Hf, Sn, Nb, Ta, and Sb and S denotes ½ when Me=Ti, Zr, Hf, or Sn and ⅔ when Me=Nb, Ta, or Sb) and x corresponding to the molar ratio of said first compound, y corresponding to the molar ratio of said second compound, and z corresponding to the molar ratio of said third compound satisfy expressions $0.76 \leq x \leq 0.91$, $0.08 \leq y \leq 0.23$, $0 < z \leq 0.05$, and $x+y+z=1$.

6. A piezoelectric ceramic composition according to claim 4, wherein said tetravalent metallic element is at least one element selected from among Ti, Zr, Hf, and Sn.

7. A piezoelectric ceramic composition according to claim 4, wherein said pentavalent metallic element is at least one element selected from among Nb, Ta, and Sb.

8. A piezoelectric ceramic composition comprising components constituting a composition corresponding to a solid solution consisting of a first compound possessing a rhombohedral system-based perovskite structure, a second compound possessing a tetragonal system-based perovskite structure, and a third compound including Bi, Mn, a tetravalent metallic element or a pentavalent metallic element, and oxygen, wherein said second compound is barium titanate.

9. A piezoelectric ceramic composition according to claim 8, wherein the compound is expressed by a general formula $[Na_{0.5x}Ba_yBi_{(0.5x+z)}][Ti_{(x+y)}(Mn_sMe_{(1-s)})_z]O_3$ (wherein Me denotes at least one element selected from among Ti, Zr, Hf, Sn, Nb, Ta, and Sb and S denotes ½ when Me=Ti, Zr, Hf, or Sn and ⅔ when Me=Nb, Ta, or Sb) and x corresponding to the molar ratio of said first compound, y corresponding to the molar ratio of said second compound, and z corresponding to the molar ratio of said third compound satisfy expressions $0.85 \leq x \leq 0.99$, $0 < y \leq 0.10$, $0 < z \leq 0.05$, and $x+y+z=1$.

10. A piezoelectric ceramic composition according to claim 8, wherein said tetravalent metallic element is at least one element selected from among Ti, Zr, Hf, and Sn.

11. A piezoelectric ceramic composition according to claim 8, wherein said pentavalent metallic element is at least one element selected from among Nb, Ta, and Sb.

* * * * *